(12) United States Patent
Shiomi et al.

(10) Patent No.: US 6,600,538 B1
(45) Date of Patent: Jul. 29, 2003

(54) LIQUID CRYSTAL DISPLAY WITH MULTI-DOMAINS AND MULTIPLE COMPENSATORS

(75) Inventors: Makoto Shiomi, Tenri (JP); Shigeaki Mizushima, 3-24, Kitashinmachi, Ikoma-shi, Nara-ken (JP)

(73) Assignee: Shigeaki Mizushima, Osaka (JP)

( * ) Notice: Subject to any disclaimer, the term of this patent is extended or adjusted under 35 U.S.C. 154(b) by 0 days.

(21) Appl. No.: 09/577,775

(22) Filed: May 24, 2000

(30) Foreign Application Priority Data

May 24, 1999 (JP) ............................. 11-142925
Apr. 24, 2000 (JP) ....................... 2000-122497

(51) Int. Cl.[7] .............................. G02F 1/1337
(52) U.S. Cl. ..................... 349/129; 349/94; 349/119
(58) Field of Search ......................... 349/177, 181, 349/136, 134, 132, 128, 126, 123, 119, 120, 112, 117

(56) References Cited

U.S. PATENT DOCUMENTS

| | | | | |
|---|---|---|---|---|
| 5,626,925 A | * | 5/1997 | Asaoka et al. .............. 428/1 |
| 5,710,611 A | * | 1/1998 | Suzuki et al. .............. 349/129 |
| 5,748,275 A | * | 5/1998 | Sato et al. ................. 349/144 |
| 6,184,957 B1 | * | 2/2001 | Mori et al. ................ 349/118 |
| 6,281,956 B1 | * | 8/2001 | Ohmuro et al. ............. 349/118 |
| 6,300,993 B1 | * | 10/2001 | Kuo et al. .................. 349/129 |

FOREIGN PATENT DOCUMENTS

| | | | |
|---|---|---|---|
| JP | 5-313156 | 11/1993 | |
| JP | 08-304631 | * 11/1996 | ............ G02B/6/00 |
| JP | 2000-081618 | 3/2000 | |

* cited by examiner

Primary Examiner—James Dudek
Assistant Examiner—Timothy Rude

(57) ABSTRACT

A liquid crystal display having in the display portion a transmission-type liquid crystal panel 1 comprising a nematic liquid crystal layer 2 having horizontal orientation and positive anisotropy of dielectric constant, a pair of transparent substrates 31, 32 having said liquid crystal layer 2 sandwiched therebetween and equipped with transparent electrodes, and a pair of polarizing plates 41, 42 arranged in cross-Nicol and having absorption axes each oriented differently from the direction of liquid crystal orientation, wherein said liquid crystal layer 2 includes two kinds of orientation regions each having a liquid crystal orientation direction that differ by approximately 180 degrees from the liquid crystal orientation direction of the other region, and further mounting a lens sheet 7 to the viewing surface side of said liquid crystal panel 1 for either scattering or refracting wider than its incident angle light ray stretched in the direction substantially parallel to the direction of liquid crystal orientation.

10 Claims, 15 Drawing Sheets

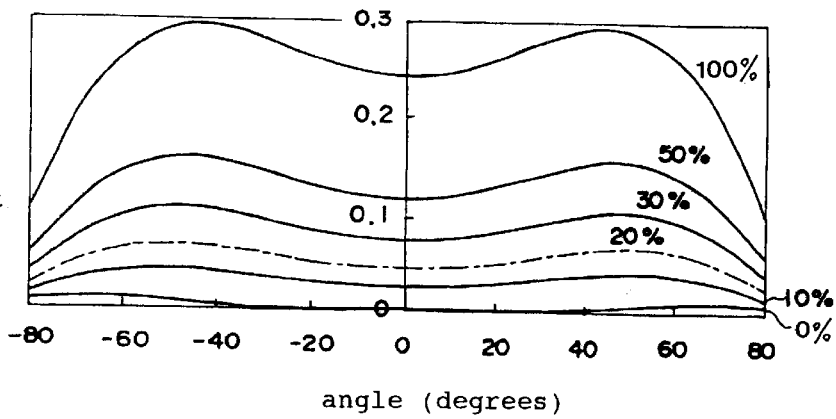
Fig. 11 (a) light
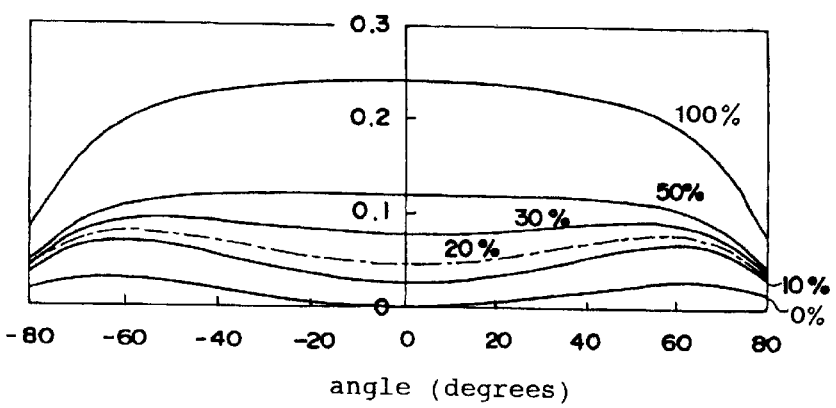
Fig. 11 (b) light
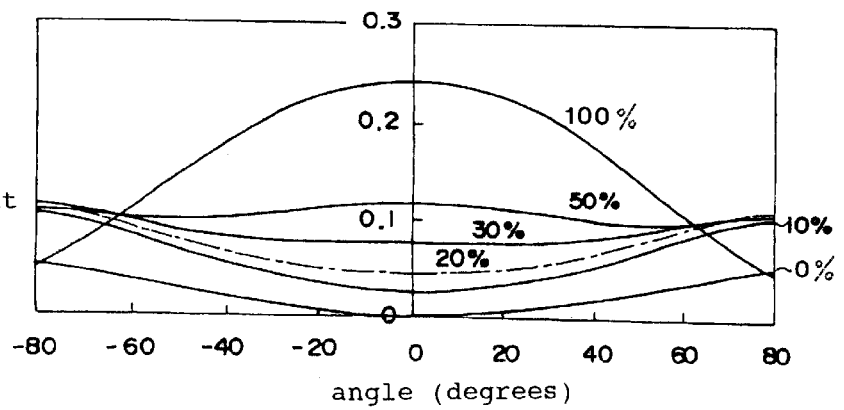
Fig. 11 (c) light

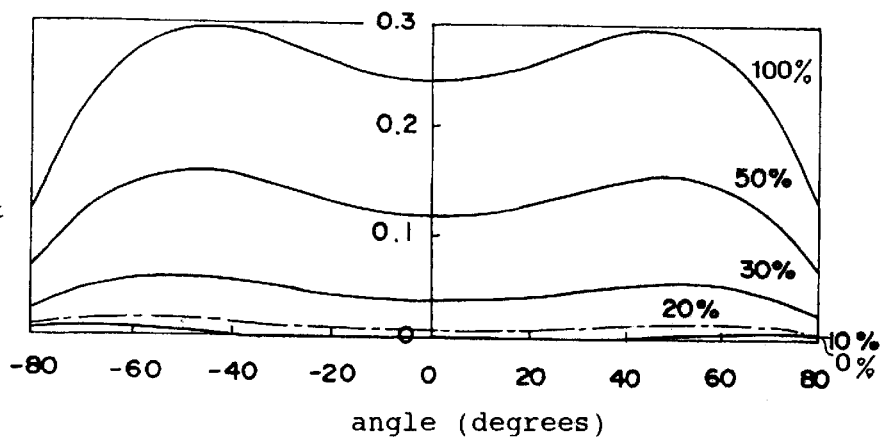
Fig. 13 (a) light
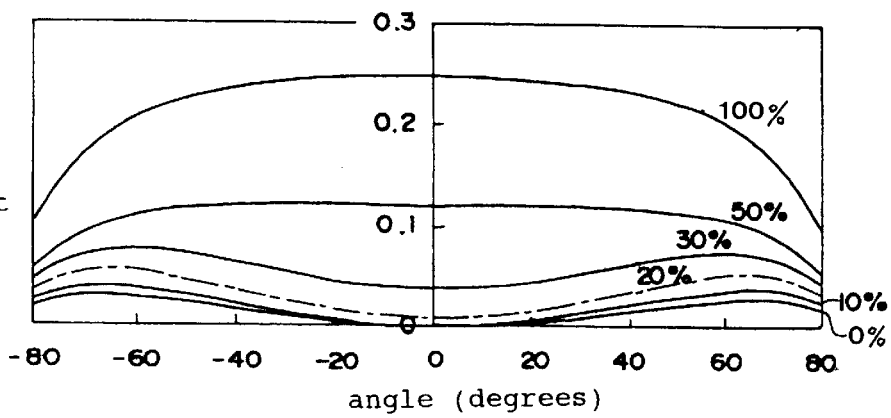
Fig. 13 (b) light
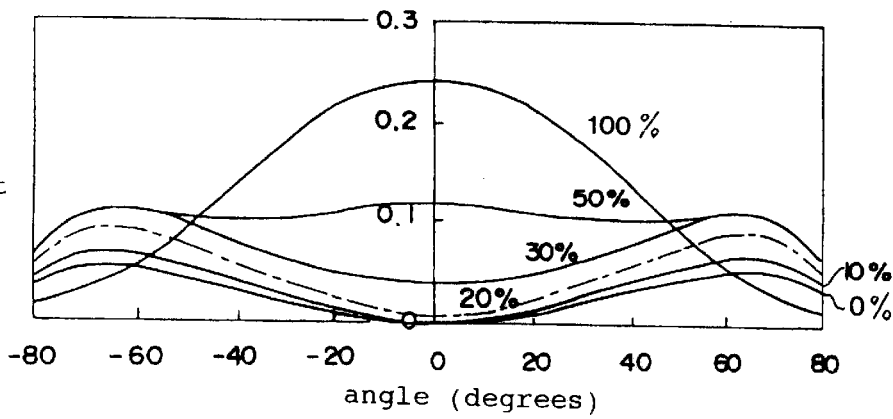
Fig. 13 (c) light rubbing direction rubbing direction

LIQUID CRYSTAL DISPLAY WITH MULTI-DOMAINS AND MULTIPLE COMPENSATORS

FIELD OF THE INVENTION

The present invention relates to a liquid crystal display utilized as a wide-viewing-angle liquid crystal television or a wide-viewing-angle liquid crystal monitor for CAD or office automation devices. The invention specifically relates to a wide-viewing-angle liquid crystal panel including a lens sheet applied to a vertical-oriented or parallel-oriented liquid crystal panel with high response speed that develops good front contrast characteristics without sacrificing brightness or response speed.

DESCRIPTION OF THE RELATED ART

Along with the development of the information infrastructure, television devices and PC monitors used as terminals for image and voice information are continuously developing. Especially, since there is a strong requirement to save space and minimize power consumption, applying liquid crystal display to the middle and small sized television and PC monitor for office appliances has now become a trend. Active-type twisted-nematic-mode and passive-type super-twisted-nematic-mode for liquid crystals are discovered and utilized widely for television and PC monitors.

However, the liquid crystal panel used for small-sized liquid crystal television or personal monitor mainly utilizes a twist nematic (TN) arrangement or a super twist nematic (STN) arrangement. The TN or STN liquid crystal has the following problems when utilized as television: the viewing angle is narrow, the colors on both ends of the screen are different, the image that each viewer sees differ when plural viewers watch the same display, and the image that the viewer sees when he or she is sitting upright differs from the image that he or she sees when lying down. Further, the TN or STN liquid crystal applied to a large PC monitor had problems such as the tone of color being changed according to the display area. These problems prevented the liquid crystal from being widely applied to televisions and monitors.

Methods aimed at solving the above-mentioned problems include a multi-domain TN (orientation division method) (Japanese Patent Application Laid-Open No. 5-107544), an ASM display method (Japanese Patent Application Laid-Open No. 6-301015), an MVA display method (Japanese Patent Application Laid-Open No. 8-43825), and an IPS display method (Japanese Patent Application Laid-Open No. 7-36058). These methods lack to provide displays with sufficient performances, and the displays were expensive to manufacture.

Moreover, along with the increase of display information density mainly caused by digital broadcasting and DVD, a liquid crystal display having high-speed response which not only characterizes in wide viewing angle but also in advanced motion image display performance is required. However, displays such as MVA and ASM have increased viewing angle, but poor response speed.

As for liquid crystal displays, various methods are being studied, including a horizontal arrangement method where a nematic liquid crystal material having positive anisotropy of dielectric constant is horizontally arranged, and a vertical arrangement method where a nematic liquid crystal material having negative anisotropy of dielectric constant is vertically arranged. The horizontal arrangement method has higher response speed and reliability compared to the twist nematic mode and the IPS mode, but these advantages were lost according to the conventional method for improving the viewing angle.

For example, in order to reduce the residual retardation directly, there is a need to provide very high voltage. This improves the viewing angle characteristic remarkably related to contrast, but it does not solve the problem of tone reversal.

A method is proposed where the pre-tilt angle is increased to reduce the tone reversal angle. However, the method utilizes an orientation film material having very weak anchoring power, which may deteriorate the orientation reliability. Even further, since the retardation of the whole display reduces according to the method, the brightness of the display is reduced. Therefore, it is effective to apply a twist arrangement or a large panel gap in order to improve the brightness of the display, but both methods reduce the response speed greatly. Therefore, the original performance of the display is lost.

Therefore, the best method to improve the viewing angle is to divide the orientation region into four parts. However, this deteriorates the viewing angle performance from all angles compared to the vertical arrangement. Further, a simple and highly reliable control method of the four-divided regions is not yet known.

There are many reports on how to improve the viewing angle using a lens film. However, most of the methods relate to the twisted nematic mode, which is inferior to MVA and IPS in the viewing angle performance, and has no improvement in its motion picture display performance.

SUMMARY OF THE INVENTION

The present invention aims at solving the problems related to the viewing angle that are generated when utilizing the conventional TN panel. Further, the present invention aims at providing a liquid crystal display having a liquid crystal panel capable of high-speed response and with a wide viewing angle performance, which, unlike the ASM or the four-division MVA, will not have any trade-off for manufacturing cost.

In order to solve the above problems, the present invention provides a liquid crystal display with a display portion formed of a transmission-type liquid crystal panel comprising a nematic liquid crystal layer having a horizontal arrangement and positive anisotropy of dielectric constant, a pair of transparent substrates having the liquid crystal layer sandwiched therebetween and equipped with transparent electrodes, and a pair of polarizing plates arranged in cross-Nicol and having absorption axes each oriented differently from the direction of liquid crystal orientation; wherein the liquid crystal layer includes two kinds of orientation regions, each region having a direction of liquid crystal orientation at an angle of approximately 180 degrees to the direction of liquid crystal orientation of the other region, and the display is further equipped with a lens sheet mounted to the viewing surface side of the liquid crystal panel for either scattering or refracting wider than its incident angle a light ray being stretched in the direction substantially parallel to the direction of liquid crystal orientation.

Further, the present invention provides a liquid crystal display further comprising a first retardation plate for compensating the birefringence of a liquid crystal layer that is parallel to the substrate surface, the birefringence generated when a specific voltage has been impressed, the first retardation plate being positioned so that its slow-phase axis direction is substantially orthogonal to the direction of liquid crystal orientation.

The present invention provides a liquid crystal display further comprising a second retardation plate having a negative retardation in the direction perpendicular to the substrate surface.

The present invention provides a liquid crystal display further comprising a third retardation plate having a slow-phase axis in the direction corresponding to the absorption axis direction of the polarizing plate.

The present invention provides a liquid crystal display wherein each retardation plate comprises two or more plates that are mounted on both outer sides of the substrates of the liquid crystal panel, and which are mounted in the following order: polarizing plate, third retardation plate, second retardation plate, first retardation plate, substrate, liquid crystal layer, substrate, first retardation plate, second retardation plate, third retardation plate, and polarizing plate.

Moreover, the present invention provides a liquid crystal display, wherein each retardation plate is formed so that the retardation plate mounted on one outer side of the substrate shows substantially the same birefringence as that of the retardation plate mounted on the other outer side of the substrate.

Further, the present invention provides a liquid crystal display, wherein the slow-phase axis direction of the liquid crystal layer when no electric field is impressed is at an angle of approximately 45 degrees to the absorption axis direction of the polarizing plate.

The present invention further provides a liquid crystal display with a display portion formed of a transmission-type liquid crystal panel comprising a nematic liquid crystal layer having a vertical arrangement and negative anisotropy of dielectric constant, a pair of transparent substrates having the liquid crystal layer sandwiched therebetween and equipped with transparent electrodes, and a pair of polarizing plates arranged in cross-Nicol and having absorption axes each oriented differently from the direction of liquid crystal orientation when electric field is impressed; wherein the liquid crystal layer includes two kinds of orientation regions, each region having a direction of liquid crystal orientation at an angle of approximately 180 degrees to the direction of liquid crystal orientation of the other region when electric field is impressed, and the display is further equipped with a lens sheet mounted to the viewing surface side of the liquid crystal panel for either scattering or refracting wider than its incident angle a light ray being stretched in the direction substantially parallel to the direction of liquid crystal orientation when electric field is impressed.

The present invention provides a liquid crystal display further comprising a fourth retardation plate having a negative retardation in the direction perpendicular to said substrate surface.

The present invention provides a liquid crystal display further comprising a fifth retardation plate having a slow-phase axis in the direction corresponding to the absorption axis direction of the polarizing plate.

The present invention provides a liquid crystal display, wherein said each retardation plate comprises two or more plates which are mounted on both outer sides of the substrates of the liquid crystal panel, and which are mounted in the following order: polarizing plate, fifth retardation plate, fourth retardation plate, substrate, liquid crystal layer, substrate, fourth retardation plate, fifth retardation plate, and polarizing plate.

The present invention further provides a liquid crystal display, wherein each retardation plate is formed so that the retardation plate mounted on one outer side of the substrate shows substantially the same birefringence as that of the retardation plate mounted on the other outer side of the substrate.

Moreover, the present invention provides a liquid crystal display, wherein the slow-phase axis direction of the liquid crystal layer when electric field is impressed is at an angle of approximately 45 degrees to the polarizing axis direction.

The present invention set the specific voltage to either equal to or over 8 V. Moreover, the present invention set the retardation of the liquid crystal layer when no voltage is impressed to a value larger than ½ wavelength condition, white-display voltage set to 1 V or more higher than the response voltage value of the liquid crystal, and the retardation of the liquid crystal layer at that time set to a range of 200 to 250 nm.

The present invention further provides an electrode opening crossing the direction of liquid crystal orientation at least to one of the transparent electrodes impressing voltage to the liquid crystal layer.

As mentioned above, the present invention realizes a more symmetric and higher contrast liquid crystal display, by applying a HA orientation and a negative retarder, and by displaying the black display with lens by high voltage.

BRIEF DESCRIPTION OF THE DRAWINGS

FIG. 11 is an explanatory view showing the viewing angle characteristic of the liquid crystal display according to embodiment 7 of the present invention;

FIG. 13 is an explanatory view showing the viewing angle characteristics of the liquid crystal display according to the comparison example;

DETAILED DESCRIPTION OF PREFERRED EMBODIMENTS

Figure 1:
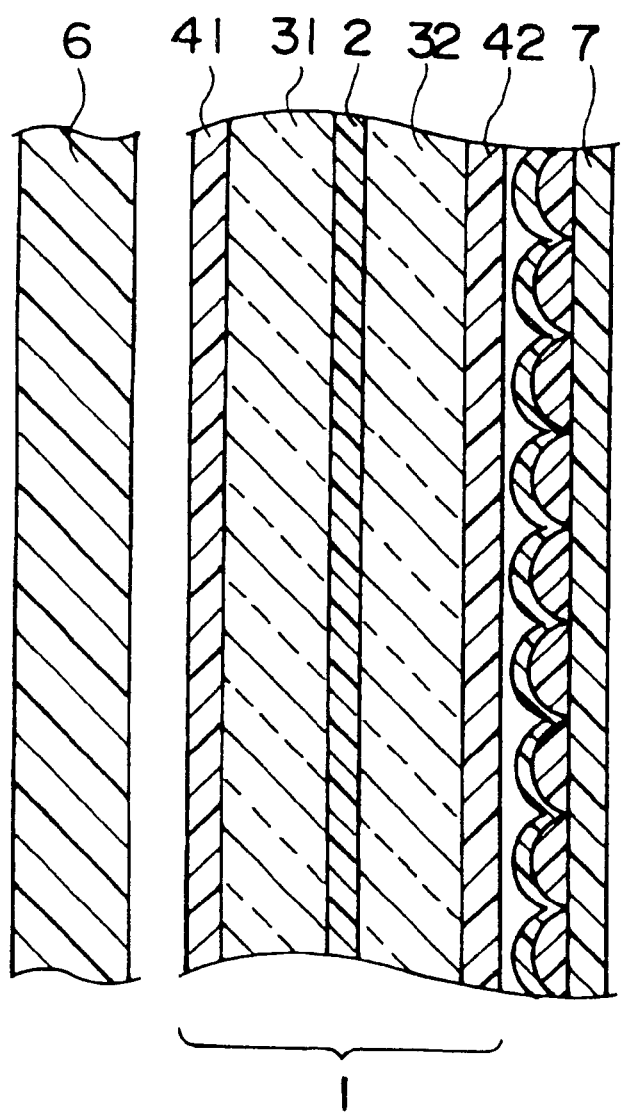
FIG. 1 is an explanatory cross-sectional view of the liquid crystal cell in the liquid crystal display according to the first embodiment of the present invention.

The preferred embodiments of the present invention will now be explained.

First, the outline of the liquid crystal display according to the present invention is explained. The liquid crystal display according to the present invention is capable of high-speed response, and has an enlarged viewing angle.

A lens sheet utilized in the liquid crystal display of the present invention will now be explained. The lens sheet is formed of a basically cylindrical lens, or a triangle pole-shaped prism lens, arranged in striped form in one direction. When a circular spot light is radiated to the lens sheet, the light traveling in the long-axis direction of the striped lens will not be changed, but the light traveling in the direction orthogonal to the axial orientation will be enlarged, and the light will either be scattered or refracted wider than the incident angle. In other words, the contrast characteristic of the front face of the display is enlarged from the enlarging direction of the liquid crystal display.

The lens sheet can be manufactured easily by a known method. For example, the lens sheet may be formed by manufacturing a film from an acrylic resin with a striped pattern, and then providing a heat sagging process to the film. Further, since any resin material will function as a lens as long as it has a refractive constant different from that of air, any formable transparent resin can be utilized as the material for the lens sheet. A material with larger refractive constant is preferable when forming the lens. However, if the refractive constant exceeds 2, actually, the material may have absorption in the visible radiation region, and therefore, it is not preferable as a material for the lens. The forming pattern of the stripes is not closely related to the liquid crystal panel, since the whole film basically functions as a uniform lens. However, when considering conditions such as generation of moiré or adjustment of focal distance, the pattern of the stripes should preferably be set to approximately ⅓ to one times the pitch of the picture elements.

An appropriate adhesive, for example, fixes the manufactured lens sheet onto the liquid crystal panel. However, since there only is a need to maintain a thin layer of air to the lens portion, the lens sheet may simply be placed above the liquid crystal panel, depending on the flatness of the film support member. A very thin layer of air is formed between the lens sheet and the liquid crystal panel, so depending on the gap of the layer, the reflected light may cause interference at the flat area of the lens, and may cause disorder of the display. In order to prevent this from happening, a shield portion may be formed to the flat area of the lens, or a very thin metal film may be equipped to lower the reflectance of the whole lens. The shield portion may be formed by printing carbon resin or metal such as chrome to the required area, or it may be substituted by providing thereto a process for reducing reflection, such as a grinding process roughening the surface of the flat area.

The present inventors have considered the above-mentioned characteristics of the lens film in studying the orientation of the liquid crystal with a widened viewing angle, and reached a conclusion that a parallel horizontal orientation divided into two parts, and a parallel vertical orientation divided into two parts, are most effective.

Figure 2:
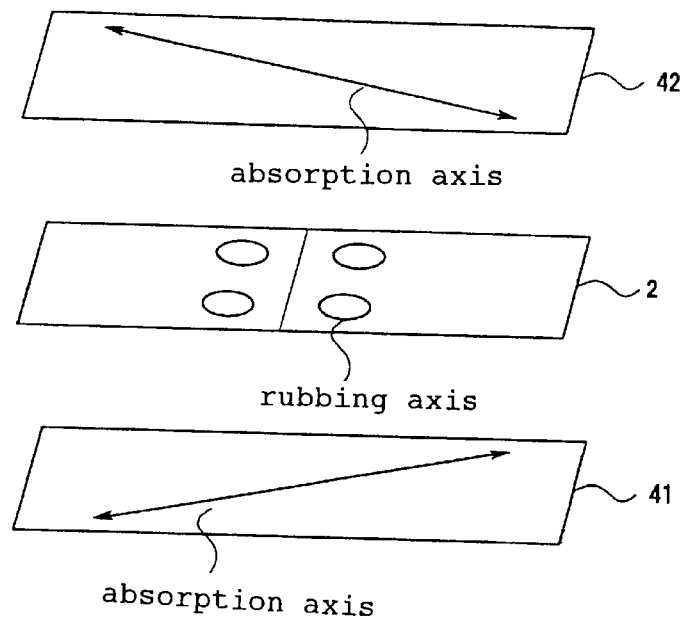
FIG. 2 is an explanatory view of the liquid crystal layer and the retardation plate of the liquid crystal display according to the first embodiment of the present invention.

The liquid crystal display according to a first embodiment of the present invention utilizing a liquid crystal with parallel orientation will now be explained. The liquid crystal display according to the first embodiment is equipped with, as shown in FIG. 1, a liquid crystal panel 1, a surface light source 6, and a lens sheet 7. The liquid crystal panel 1 comprises a liquid crystal layer 2, a pair of substrates 31 and 32, a pair of polarizing plates 41 and 42, and so on. The pair of substrates 31 and 32 has the liquid crystal layer 2 sandwiched therebetween, and comprises transparent electrodes, not shown, on the sides that contact the liquid crystal layer 2. As shown in the perspective view of FIG. 2, the polarizing plates 41 and 42, which are placed in cross-Nicol relations, each have an absorption axis that differ from the rubbing axis, or in other words, orientation of the liquid crystal layer 2. The surface light source 6 radiates light from a fluorescent lamp (not shown) to the liquid crystal panel 1 in a uniform planar state. The lens sheet 7 diffuses the transmitted light from the liquid crystal panel 1, or refracts the transmitted light wider than its incident angle.

Figure 3:
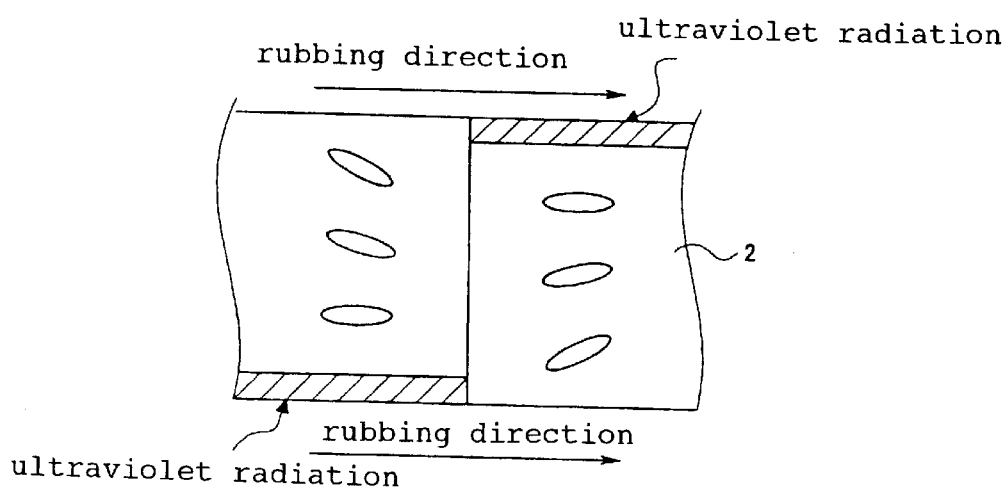
FIG. 3 is an explanatory view of the liquid crystal layer of the liquid crystal display according to the first embodiment of the present invention.

The liquid crystal layer 2 is a nematic liquid crystal layer having horizontal orientation and positive anisotropy of dielectric constant. The liquid crystal layer 2 is divided into two kinds of orientation regions, with one orientation direction being at an angle of 170 to 190 degrees, preferably approximately 180 degrees, to the other orientation, so that they are arranged roughly along one axial direction. When the orientation directions are dislocated more than 10 degrees from a straight line, the viewing angle characteristics will become asymmetric, which makes it difficult for the lens sheet 7 to compensate for the viewing angle. There are many ways to form two kinds of orientation regions, and the known liquid crystal orientation techniques including the combination of rubbing and optical tilt control, mask rubbing, or the use of optical orientation films can be used. For example, as shown in FIG. 3, the layer may be divided into two parts in the rubbing direction, and ultraviolet is radiated to the front surface of one region and the back surface of the other region. When each picture element of the display is divided into parts, each having an area ratio of 1:1, a symmetrical viewing angle characteristic is obtained. The shape of each orientation region is not limited, but preferably, each picture element should be divided into two parts or four parts by straight lines, so that each region has a roughly rectangular shape. A simple mask can be used to divide the picture elements into rectangular shaped regions. Moreover, depending on the display size, two adjacent display picture elements can be handled as one set, forming regions each having a shape that corresponds to that of the picture elements. This enables to simplify division of regions using the display pattern. When applying such method, the shape of the regions should preferably be in a striped pattern or a checkered pattern, in order to realize a uniform display. The direction of liquid crystal orientation of the regions, which are substantially aligned in uniaxial direction, are each at an angle of approximately 45 degrees to the absorption axis orientation of the polarizing plate. Since the brightness of the liquid crystal panel is influenced by the birefringence caused when the liquid crystal layer is in horizontal orientation, the phase difference should most preferably be in a half-wave state. When the refractive index difference $\Delta n$ of the liquid crystal layer is the same, the thickness of the liquid crystal panel can be set to a smaller value if the above-mentioned angle is 45 degrees. This is even more advantageous in improving the viewing angle.

When electric field is impressed to the panel, the two orientation regions of the liquid crystal layer will rise up in opposite directions, which prevents middle tone reversal from occurring in the direction of liquid crystal orientation. Further, since the above-mentioned state of the liquid crystal layer is symmetric, the front face of the liquid crystal panel will have the best viewing characteristics. Of course, the display will show a symmetrical viewing angle characteristic at an azimuth perpendicular to the liquid crystal orientation.

Figure 4:
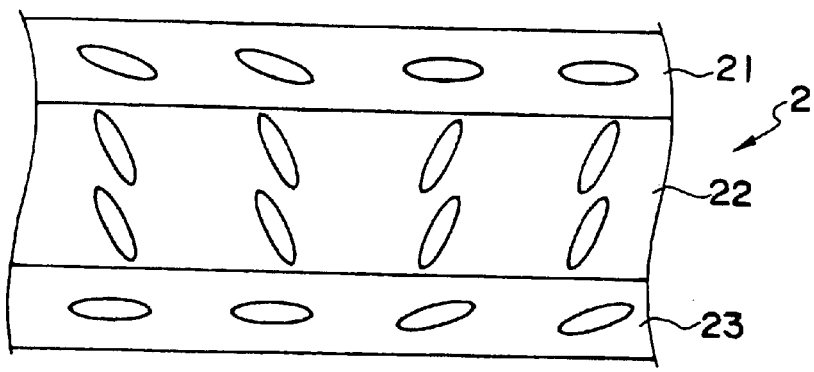
FIG. 4 is an explanatory view of the residual retardation of the liquid crystal display.

When sufficient voltage is applied to the panel, the liquid crystal orientation will become substantially perpendicular, and retardation becomes vary small. When the liquid crystal panel is viewed from the front, almost all the surface is black under cross-Nicol orientation. Moreover, strong regulating force acts between the liquid crystal layer and the orientation film. Therefore, when a voltage of approximately 5 V (utilized for normal active elements) is applied to the panel, there exist regions 21 and 23 where the liquid crystal orientation is not changed, as shown in FIG. 4. This is called a residual retardation, the size of which depending on the liquid crystal material, but mostly in the range between 20 to 50 nm. Though this value is small, it causes black fields to appear on a high contrast display.

Figure 5:
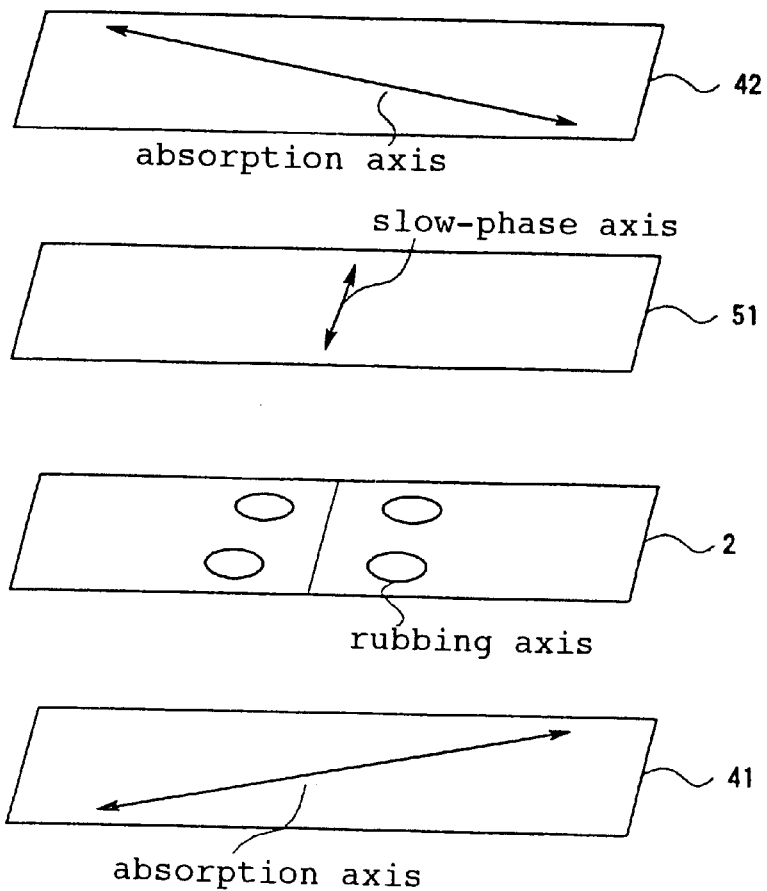
FIG. 5 is an explanatory view of the liquid crystal layer and the retardation plate of the liquid crystal display according to the second embodiment of the present invention.

The liquid crystal display according to a second embodiment of the present invention that solves the above-mentioned problem is explained with reference to FIG. 5. When compared to the liquid crystal display according to embodiment 1, the liquid crystal display according to the second embodiment is characterized in that it is equipped with a first retardation plate 51. The first retardation plate 51, along with the liquid crystal layer 2, is sandwiched between a pair of polarizing plates 41, 42 placed in cross-Nicol. The first retardation plate 51 is a compensating retardation plate having a slow-phase axis in the parallel direction. When electric field is impressed, the retardation plate becomes substantially equal to the residual retardation of the uniaxial liquid crystal layer 2 residing in the direction parallel to the substrate surface, and it is positioned substantially orthogonal to the liquid crystal orientation (rubbing axis). The first retardation plate 51 compensates for the retardation observed from the front face of the liquid crystal panel 1. As a result, a liquid crystal panel 1 having a high contrast of over 300 when voltage is impressed can be obtained easily. It is also possible to place the first retardation plate 51 to the incident side of the liquid crystal layer 2.

Figure 6:
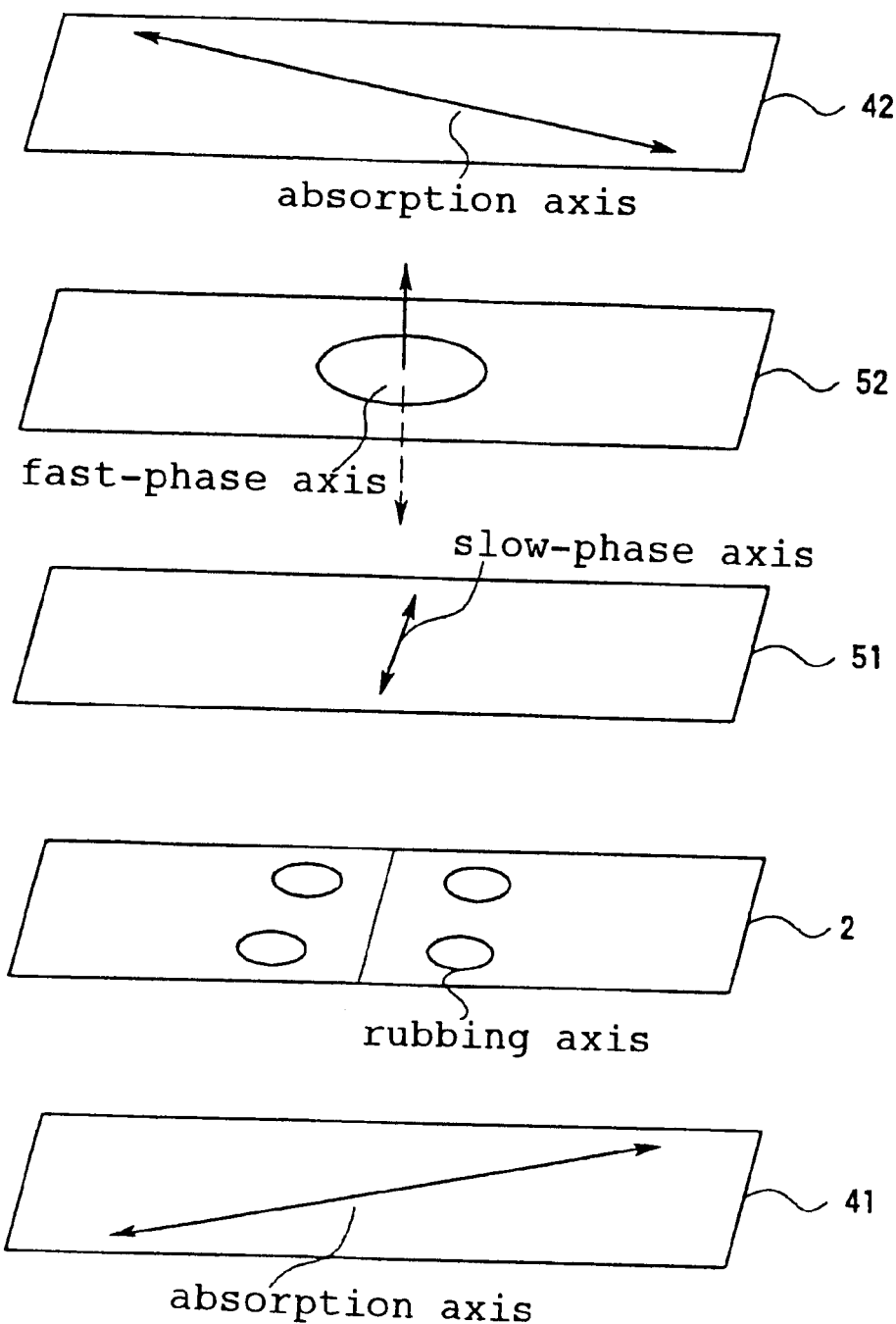
FIG. 6 is an explanatory view of the liquid crystal layer and the retardation plate of the liquid crystal display according to the third embodiment of the present invention.

The liquid crystal display according to the third embodiment of the invention will now be explained with reference to FIG. 6. Compared to the liquid crystal display according to embodiment 2, the liquid crystal display according to embodiment 3 is characterized in that it comprises a second retardation plate 52. The second retardation plate 52, along with a liquid crystal layer 2 and a first retardation plate 51, is sandwiched between a pair of polarizing plates 41 and 42 arranged in cross-Nicol. When the viewing angle observing the liquid crystal panel of the horizontally oriented liquid crystal display according to embodiment 2 is slanted, a birefringence is generated that cannot be compensated only by retardation in the horizontal orientation. In order to compensate for the retardation or phase difference, the present embodiment provides a second retardation plate 52 having a fast-phase axis oriented perpendicular to the substrate surface of the liquid crystal display. The second retardation plate 52 comprises a negative retardation in the direction perpendicular to the substrate surface, and the retardation size is determined by the balance between the retardation of the first retardation plate 51 and the liquid crystal layer 2 existing in the plane parallel to the substrate. Normally, the liquid crystal layer is set to approximately 270 nm in order to secure brightness, so it is preferable to assemble a perpendicularly negative retardation plate. As a result, the black display during voltage impression is good, except in the direction of liquid crystal orientation. Of course, the polarizing plates 41 and 42 generally include a TAC layer and the like showing birefringence anisotropy in the perpendicular direction, and in such case, the preferred retardation size of the second retardation plate 52 is changed. Moreover, the second retardation plate 52 manufactured for example by a drawing process may include a little retardation in the horizontal direction. However, positioning an appropriate horizontal retardation plate can compensate for such retardation. Further, the retardation can be matched to the adsorption axis direction of the polarizing plate, so that there is no loss to the front face transmission rate. Of course, the present invention includes such improvements.

Figure 7:
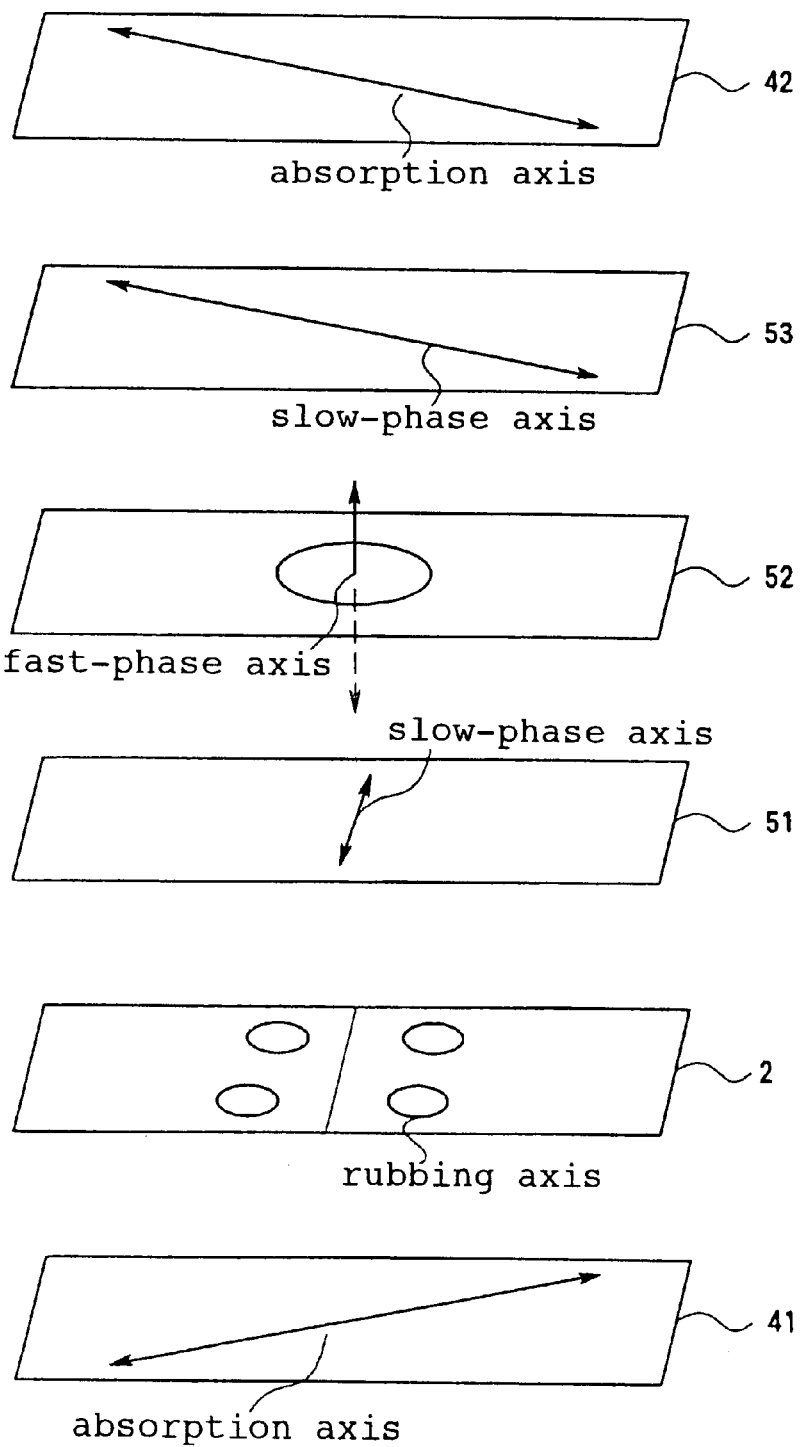
FIG. 7 is an explanatory view of the liquid crystal layer and the retardation plate of the liquid crystal display according to the fourth embodiment of the present invention.

The horizontally oriented liquid crystal display according to embodiment 4 of the present invention will now be explained with reference to FIG. 7. Compared to the liquid crystal display according to embodiment 3, the liquid crystal display according to embodiment 4 is characterized in that it comprises a third retardation plate 53. The third retardation plate 53, along with the liquid crystal layer 2, the first retardation plate 51 and the second retardation plate 52, is sandwiched between the pair of polarizing plates 41 and 42 arranged in cross-Nicol. When the viewing angle for observing the horizontally oriented liquid crystal display according to embodiment 3 is slanted and the azimuth is changed, an optical leakage caused by the change in apparent positioning angle of the polarizing plate is observed. In order to prevent this from happening, it is effective to place a third retardation plate 53 having a slow-phase axis in the direction substantially parallel to the absorption axis direction of the polarizing plate to the liquid crystal display. The positioning angle of the slow-phase axis of the third retardation plate 53 is varied in correspondence to the change in position of the polarizing plates 41 and 42 according to the viewing angle, so as to cancel the influence of the viewing angle. Next, the fact that the viewing angle in the direction of liquid crystal orientation is not sufficient according to the above will be explained. A liquid crystal orientation model is shown in FIG. 4 showing the state in which electric field is impressed to the liquid crystal display. FIG. 4 shows a residual retardation layer 21 and a residual retardation layer 23 positioned near the interface of the orientation film, and a liquid crystal layer 22 oriented substantially perpendicular to the substrate surface in the center area of the panel. The residual retardation layers 21 and 23 have a horizontal retardation, and retardation in the perpendicular direction corresponding to the tilt angle. When the viewing angle is slanted from the orientation direction to an angle intermediate the tilt angle of the residual retardation layers 21 and 23, the retardation of one residual retardation layer (21) is reduced, and the retardation of the other residual retardation layer (23) is increased. Such influence becomes greater when the tilt angle becomes smaller. Therefore, in the direction of liquid crystal orientation, reversal occurs to a tone close to white, and the viewing angle is narrowed.

Figure 8:
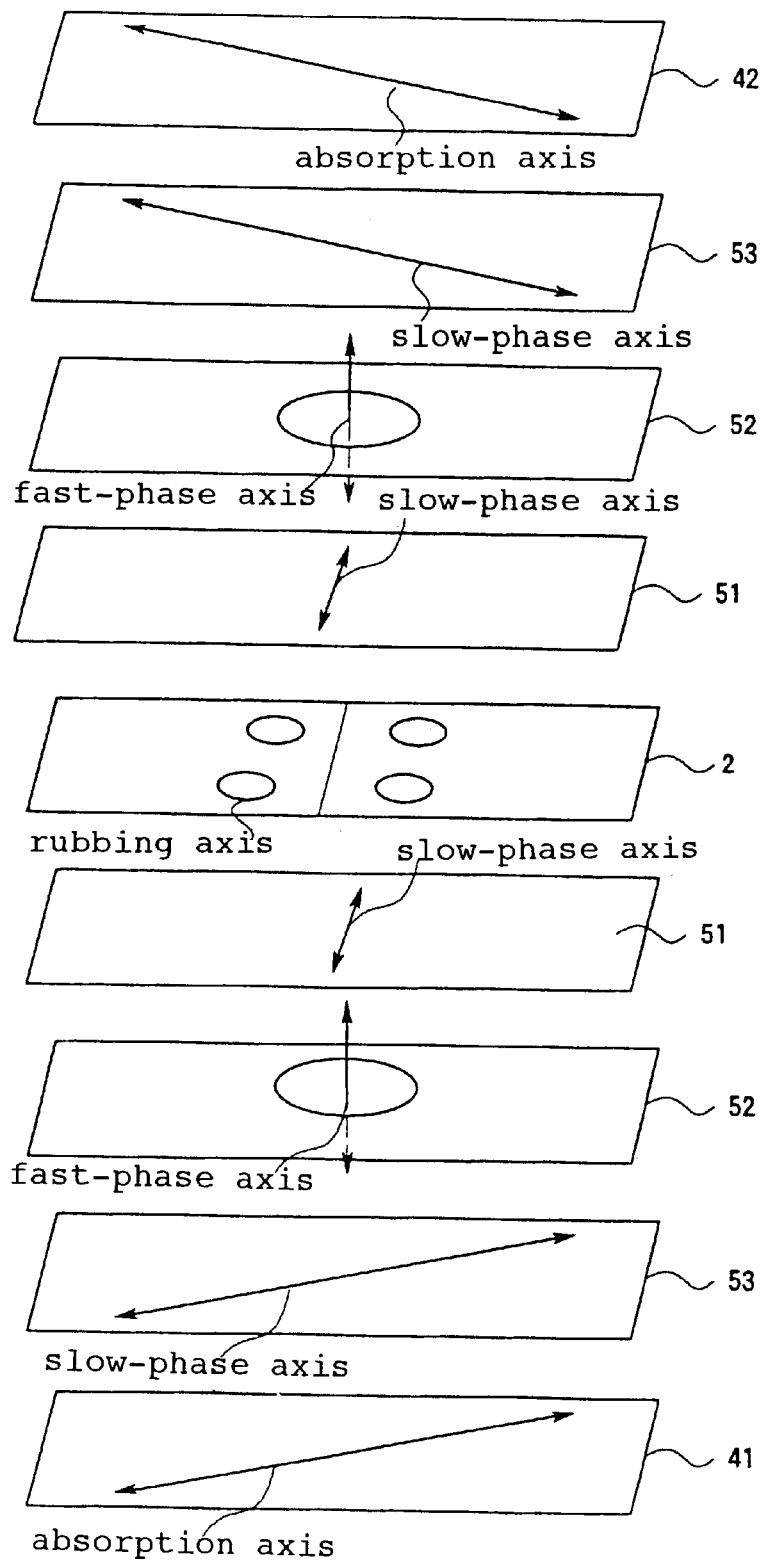
FIG. 8 is an explanatory view of another design of the liquid crystal layer and the retardation plate of the liquid crystal display according to the fourth embodiment of the present invention.

The liquid crystal display according to embodiment 4 is explained through an example where the retardation plates 51, 52 and 53 are all placed in the observation side of the liquid crystal panel 1. However, the retardation plates may either be positioned in the light source side of the panel, or positioned on both sides of the panel. Further, considering the difficulty of manufacturing a retardation film having a great negative retardation in the perpendicular direction, the difficulty of adjusting the wavelength dependency utilizing films formed of different materials, and the difficulty of performing a fine adjustment to the retardation size, it is even more preferable for each retardation plate to be formed of two or more sheets mounted to both sides of the substrates 31 and 32 of the liquid crystal panel 1. One example of such structure is shown in FIG. 8 as a liquid crystal display having another design according to embodiment 4 of the invention. The present example corresponds to FIG. 7, but with two sheets for each of the first, second and third retardation plates 51 through 53. A first retardation plate group comprising first, second and third retardation plates 51–53, and a second retardation plate group comprising first, second and third retardation plates 51–53 are placed to both sides of the substrates 31 and 32 of the liquid crystal panel. Thereby, various necessary adjustments may be performed easily. Further, as for the examples shown in FIG. 5 and FIG. 6, it is also possible to provide two sheets of first retardation plate 51 and two sheets of second retardation plate 52, and to position a first retardation plate group comprising first and second retardation plates 51, 52 to one side of the substrates 31, 32 and a second retardation plate group comprising first and second retardation plates 51, 52 to the other side of the substrates 31, 32 of the liquid crystal panel.

Next, the method for obtaining a more symmetric and higher contrast display according to the liquid crystal display of the present invention will be explained. The method obtains a more symmetric and higher contrast display by setting the voltage of the black display to 8 V or more. Since generality is not influenced by the present method, the method is explained using the liquid crystal display having a structure shown in FIG. 8.

Embodiments 1 through 4 of the present invention utilize a lens sheet 7 as shown in FIG. 1 in order to form a liquid crystal display having relatively small tone reversal. However, it is even more preferable to reduce the viewing angle dependency of the contrast or tone reversal from the fundamental liquid crystal mode. This is because if restrictions related to tone reversal or viewing angle dependency of the contrast are reduced, a lens having a wider angle of output light can be used. Necessarily, by limiting the enlarging angle, the efficiency of light can be improved.

The residual retardation 21 and 23 of the liquid crystal layer 2 shown in FIG. 4 will be reduced dynamically by raising the impressed voltage. As a result, the retardation of the compensating retardation plate 51 can be reduced, and therefore, the retardation of the liquid crystal can be more completely compensated by the retardation plate 52.

Further, the liquid crystal display according to the present invention is capable of further restraining tone reversal by adjusting the white voltage and the retardation of the liquid crystal layer 2. Tone reversal is caused by the tilt angle of the two different orientation regions being changed excessively within a driving voltage region, for example, being changed from substantially 0 degrees to substantially 90 degrees. Since the viewing angle dependencies of the regions differ greatly, averaging cannot compensate it. In other words, compensation will be much easier if the tilt angle of the whole area will not change.

From reasons mentioned above, it is better to have smaller residual retardation. It is difficult to reduce the liquid crystal tilt angle of the black-state by reducing voltage. Therefore, according to the present invention, the tilt angle of the white-state is increased. However, it is very difficult to produce a large tilt angle stably. A well-known technique for producing a large white-state tilt angle includes oblique deposition of silicon oxide, and weak-rubbing. However, the oblique deposition is not fit for mass production, and the weak-rubbing is also not fit for mass production because the tilt angle is not stable.

Considering the above conditions, the present invention controls the tilt angle directly by voltage. In other words, the present invention utilizes the liquid crystal orientation originally used to display middle tone, and applied it to display white. By applying the liquid crystal orientation normally used to display middle tone to display white, the present invention enables to reduce the retardation of the liquid crystal. The reduced portion can either be compensated by setting the panel thicker in advance, or by increasing the $\Delta n$ of the liquid crystal material.

Studies are performed to find a voltage value that will not cause tone reversal. It is discovered that by utilizing voltage that is more than 1 V greater than the response voltage threshold of the liquid crystal, tone reversal rarely becomes a problem. The liquid crystal retardation at that time is larger than ½ wavelength, and in the range of 300 to 400 nm. By impressing voltage thereto, the liquid crystal retardation may be reduced to about 200 to 270 nm. If the initial retardation is smaller than 300 nm, the retardation to be utilized becomes too small, and as a result, the utilization efficiency of the light is deteriorated. If the retardation is more than 350 nm, the white voltage is raised higher than necessary, causing problems such as increase of consumption power and design problems related to the liquid crystal driver.

The liquid crystal display according to the fifth embodiment of the present invention will now be explained. In embodiment 5, the liquid crystal display is manufactured similarly as explained in embodiment 4 shown in FIG. 8. However, in the present embodiment, the thickness of the liquid crystal panel is set to 4 $\mu$m, and the $\Delta n$ of the liquid crystal material is set to 0.9. The retardation plate 51 is adjusted so that the transmission rate is minimized when the impressed voltage is 10 V. As a result, a liquid crystal panel having a maximum transmission rate at a voltage of 3.5 V is obtained.

Figure 14:
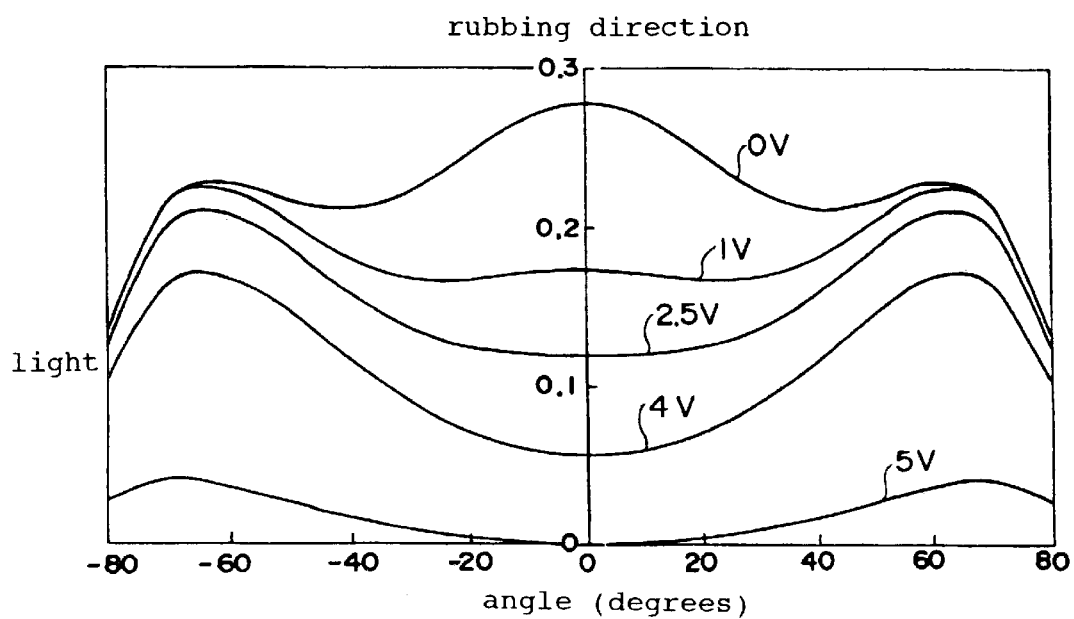
FIG. 14 is an explanatory view showing the viewing angle characteristics of the liquid crystal display according to embodiment 5 of the present invention.
Figure 15:
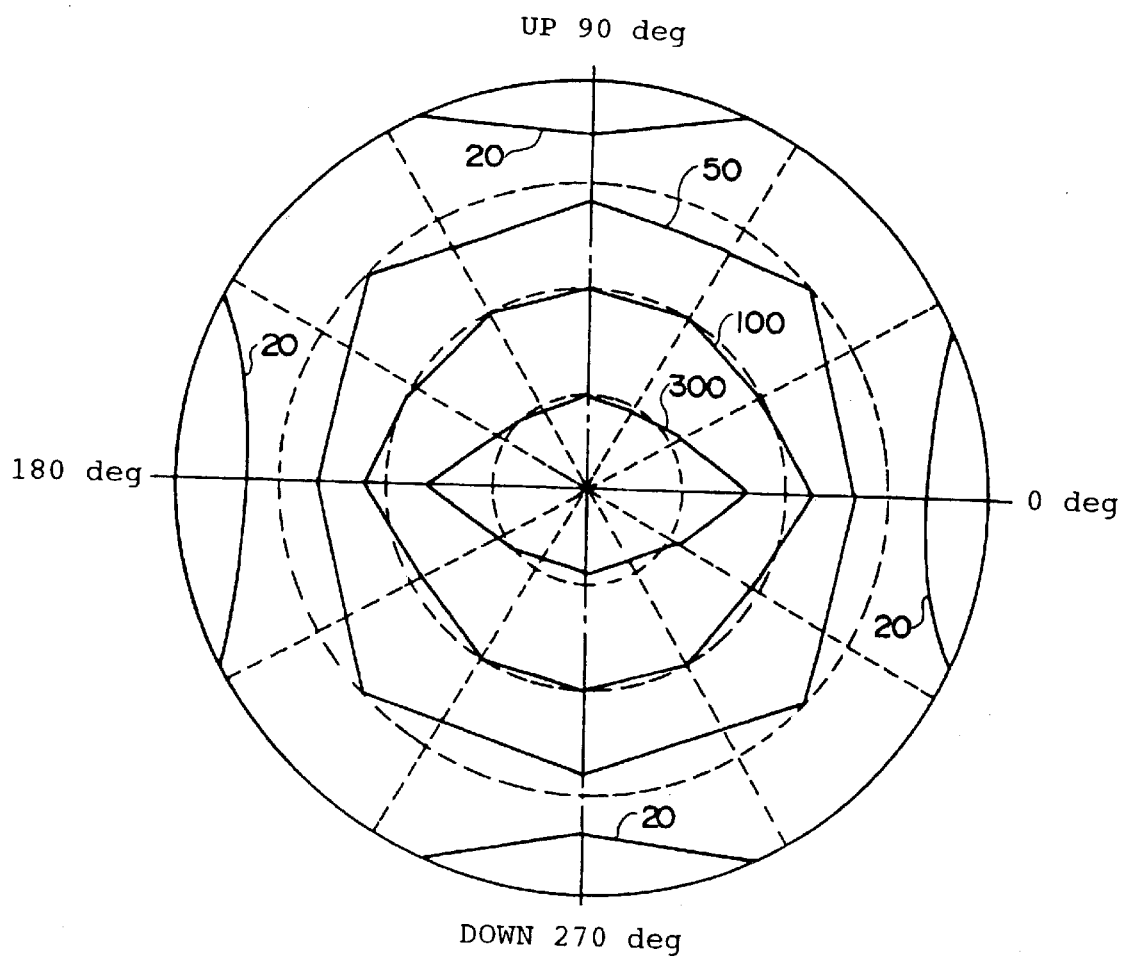
FIG. 15 is an explanatory view showing the equal contrast curve of the liquid crystal display according to embodiment 5 of the present invention.

The viewing angle dependency of the transmission rate in the rubbing orientation of the liquid crystal display according to embodiment 5 is evaluated. As shown in FIG. 14, it is discovered that no tone reversal is observed. When a lens sheet 7 similar to that applied in the liquid crystal display according to embodiment 1 is assembled to the display of embodiment 5, a good viewing angle characteristics is obtained, as shown in FIG. 15.

Next, a liquid crystal display having parallel perpendicular orientation according to embodiment 6 of the present invention will be explained. It is even more effective to provide a lens sheet to a liquid crystal display with a parallel perpendicular orientation. The liquid crystal display according to embodiment 6 of the invention has an arrangement similar to the liquid crystal display having horizontal orientation according to embodiment 1 shown in FIG. 1 and FIG. 2. The display comprises a liquid crystal panel 1, a surface light source 6, and a lens sheet 7. It further comprises a liquid crystal layer 2, a pair of substrates 31 and 32, and a pair of polarizing plates 41 and 42. A liquid crystal material having negative anisotropy of dielectric constant is injected to the liquid crystal layer 2. The layer 2 comprises two kinds of orientation regions. When voltage is impressed to the liquid crystal region, the liquid crystal orientation changes to a horizontal orientation according to the orientation process. In the horizontal orientation condition, the liquid crystal has a uniaxial orientation in which the orientations of the two liquid crystal regions differ by approximately 180 degrees. The known methods related to horizontal orientation films for forming different orientation regions can be utilized without major changed, including the combination of rubbing and optical tilt control, optical orientation, and mask rubbing. The present liquid crystal panel is normally-black, and the contrast can be over 500. Moreover, according to the present embodiment, the voltage used to display white is set to 5 V.

Figure 9:
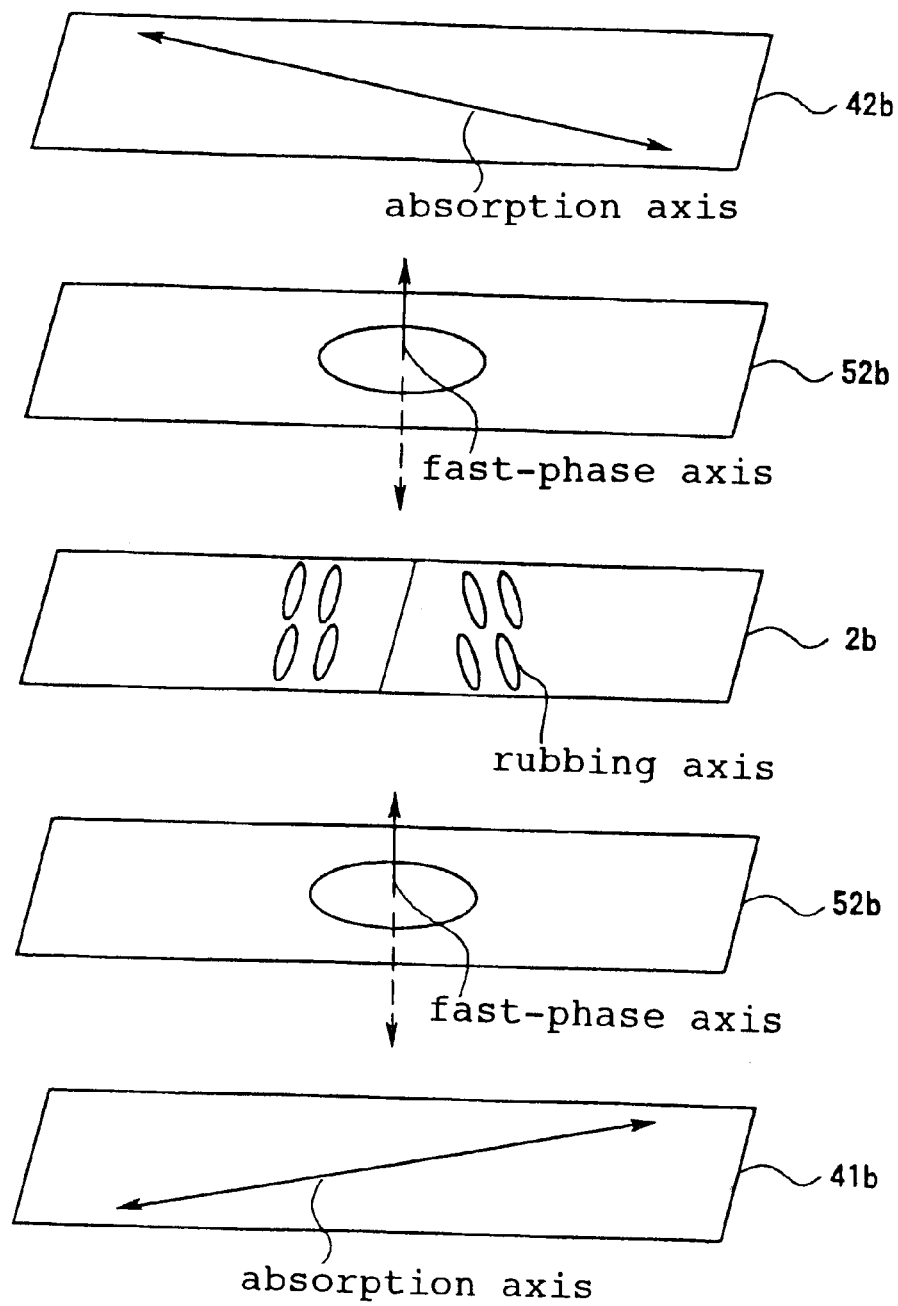
FIG. 9 is an explanatory view of the liquid crystal layer and the retardation plate of the liquid crystal display according to embodiment 6 of the present invention.

FIG. 9 is used to explain the liquid crystal display according to embodiment 7 of the present invention. Compared to the liquid crystal display according to embodiment 6, the liquid crystal display according to embodiment 7 is characterized in that it comprises a pair of fourth retardation plates 52b, 52b. The fourth retardation plates 52b, along with a liquid crystal layer 2b, are sandwiched between the pair of polarizing plates 41b and 42b arranged in cross-Nicol. Each fourth retardation plate 52b comprises a fast-phase axis in the direction perpendicular to the substrate surface, and with a negative retardation. When the viewing angle is slanted in observing the liquid crystal display according to embodiment 6, the liquid crystal retardation perpendicular to the substrate surface functions and black field is generated. However, unlike the liquid crystal display with horizontal orientation, the liquid crystal display according to embodiment 7 equipped with the pair of fourth retardation plates 52b, 52b is free from residual retardation problems, and therefore, completely compensates for the generation of black field.

The liquid crystal display according to embodiment 8 of the present invention will now be explained. Compared to the liquid crystal display according to embodiment 7 shown in FIG. 9, the liquid crystal display according to embodiment 8 is characterized in that it further comprises a fifth retardation plate. The fifth retardation plate is arranged, together with the liquid crystal layer and the fourth retardation plate, between the pair of polarizing plates arranged in cross-Nicol. The fifth retardation plate has a slow-phase axis in the same direction as the absorption axis of the polarizing plate. According to the liquid crystal display of embodiment 7, the positioning angle of the polarizing plate varies according to the viewing angle. However, by applying a fifth retardation plate having a slow-phase axis in the same direction as the absorption axis of the polarizing plate, embodiment 8 enables to compensate for the change in the positioning angle of the polarizing plates.

Similar to the liquid crystal displays having horizontal orientation according to embodiments 1 through 4, the liquid crystal display having vertical orientation may be equipped with one retardation plate, or two or more retardation plates. When two or more retardation plates are equipped to the panel, they can be arranged on both sides of the liquid crystal panel substrate, with the retardation plate arranged on one side showing substantially the same birefringence as the retardation plate positioned on the other side.

The problem related to the viewing angle of the above-mentioned vertical-oriented liquid crystal display is that middle tone reversal close to white often occurs in the direction of the liquid crystal orientation. Many researchers have reported ways to prevent such problem. For example, a four-division MVA method is known. Unlike the parallel orientation, the method does not deteriorate performance of the display, but it is difficult to directly control the orientation by rubbing and the like, and so it involves many processes such as formation of steps. An orientation control method utilizing electrode openings is known, but its response is domino-like, and the original response speed can not be maintained. When the liquid crystal region is divided into two parts, the above-mentioned problem can be solved by reducing the voltage so as to restrain the tilt angle during white display. However, this causes lack of retardation, and turns white display into black, increases the gap, and deteriorates response by low voltage. Therefore, the lens sheet should also be applied to the liquid crystal display having vertical orientation, in order to solve the problem of reversal, and to provide high voltage that could not be applied to the conventional VA. As a result, a thin liquid crystal panel that is bright and capable of high-speed response is provided.

The liquid crystal display according to the eighth embodiment of the present invention will be explained. As shown in FIG. 1, the liquid crystal display according to the present embodiment comprises a liquid crystal panel 1, a surface light source 6, a lens sheet 7 and so on. The surface light source 6 comprises a cold-cathode fluorescent lamp, and a lighting body for outputting the incident light from the cold-cathode fluorescent lamp in a uniform planar state.

The liquid crystal panel 1 comprises an active matrix substrate 31 wherein a thin-film transistor and a transparent electrode are formed on a transparent substrate in a matrix-state, a twisted nematic liquid crystal with a twist angle of approximately 90 degrees, and a color filter substrate 32 including a transparent electrode and a color filter. The liquid crystal is injected between the two substrates 31 and 32. On the outer side of the substrates 31 and 32 of the liquid crystal display are mounted a pair of polarizing plates 41 and 42. Further, on the outer side of the polarizing plate 42 facing the viewer is a lens sheet 7 acting as a light diffusion layer.

The liquid crystal display of a comparison example is now explained. In the comparison example, the liquid crystal panel is formed to have the same structure as embodiment 1, but without the lens sheet 7.

Figure 10:
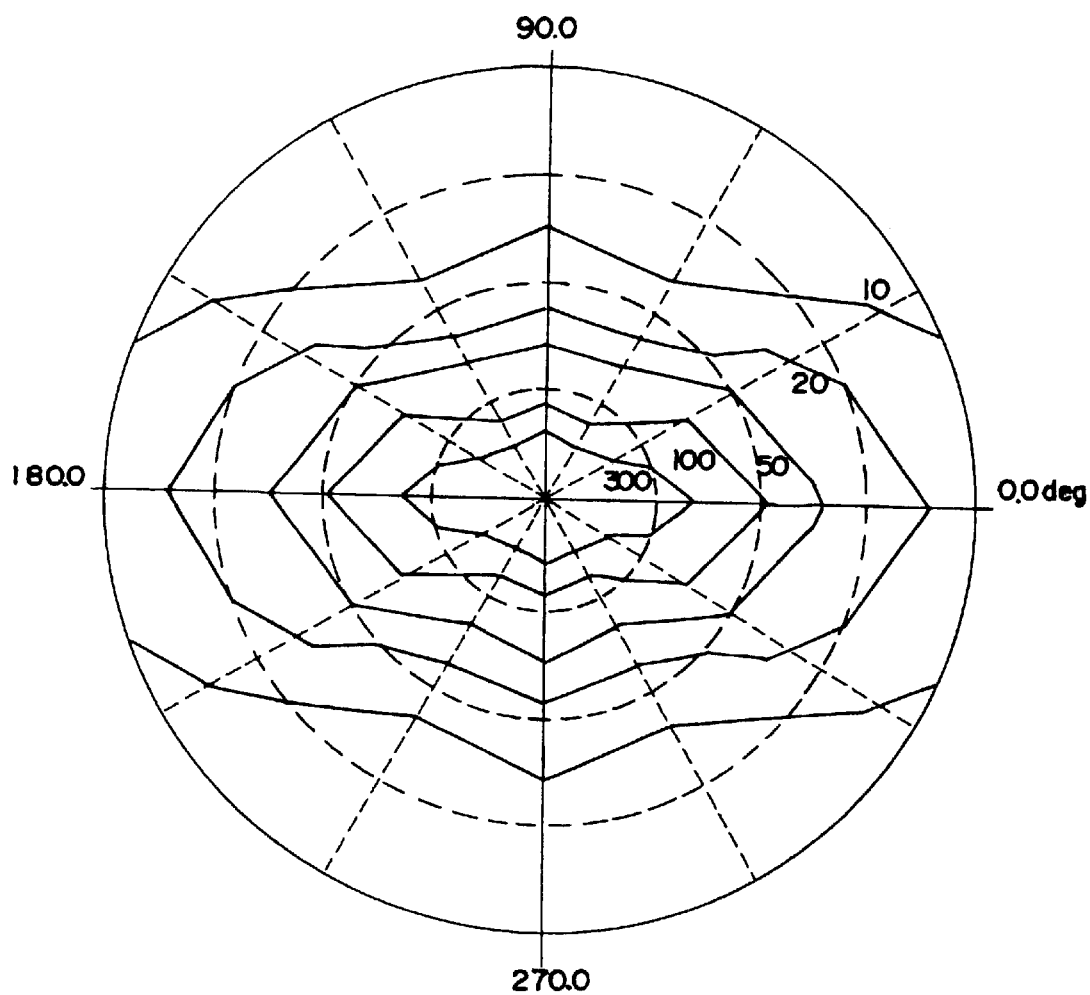
FIG. 10 is an explanatory view of the equal contrast characteristic curve of the liquid crystal display according to embodiment 7 of the present invention.
Figure 12:
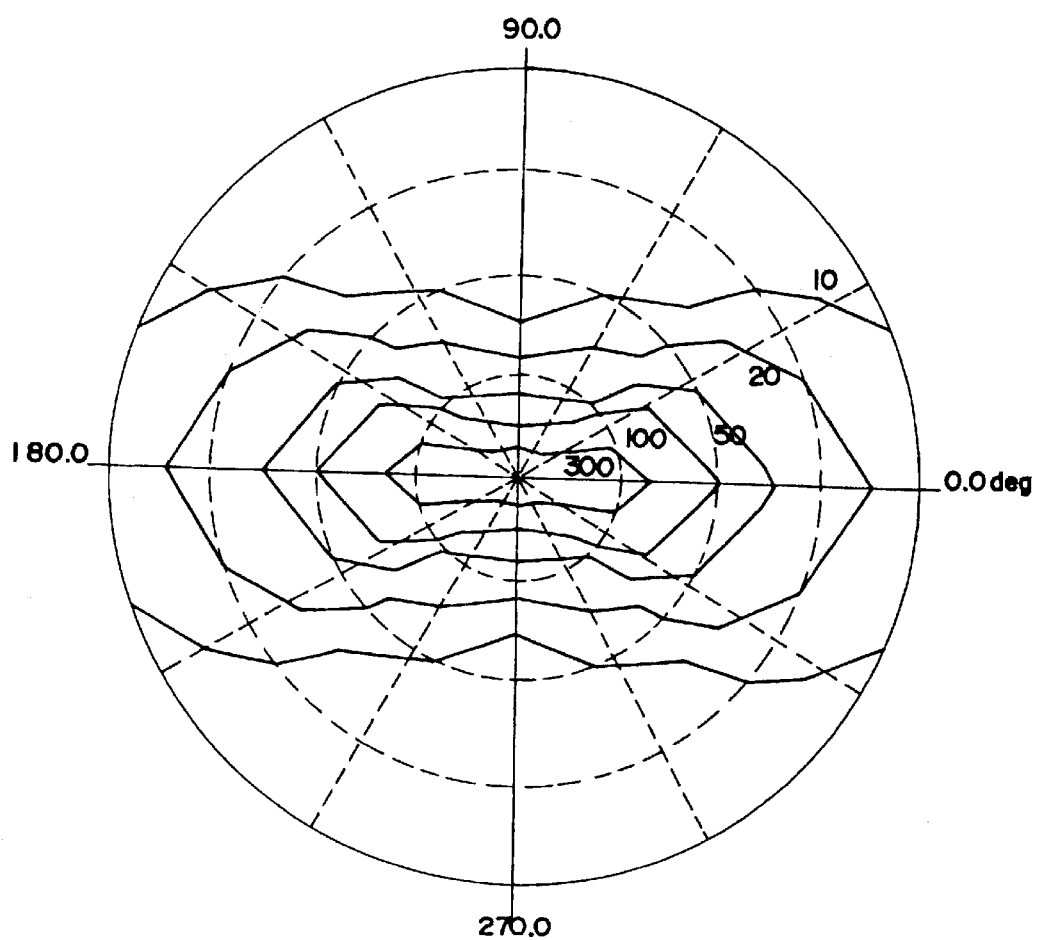
FIG. 12 is an explanatory view of the equal contrast curve according to the comparison example.

An equal contrast curve of the liquid crystal display according to embodiment 8 is shown in FIG. 10. The viewing angle characteristics of the liquid crystal display according to the present embodiment during middle tone display is shown in FIG. 11, wherein (a) shows the orientation perpendicular to the rubbing axis, (b) shows the absorption axis orientation of the polarizing plate, and (c) shows the rubbing orientation. FIG. 11 shows the viewing angle characteristics during middle-tone display (the transmission rate to the frontward direction is 10%, 20%, 30% and 50%), wherein the transmission rate to the frontward direction is 0% when voltage is impressed, and the transmission rate to the frontward direction is 100% when white-display voltage of 5V is impressed. The equal contrast curve of the liquid crystal display according to the comparison example is shown in FIG. 12. The viewing angle characteristics of the liquid crystal display according to the comparison example during middle tone display is shown in FIG. 13, wherein (a) shows the orientation perpendicular to the rubbing axis, (b) shows the absorption axis orientation of the polarizing plate, and (c) shows the rubbing orientation. The liquid crystal display according to FIGS. 11 and 13 are set to have a white-display voltage of 5 V.

FIGS. 10 and 12 showing equal contrast curves are compared. The liquid crystal display according to embodiment 8 has a wider range of equal contrast compared to the liquid crystal display of the comparison example. Moreover, FIGS. 11 and 13 showing the viewing angle characteristics during middle tone display are compared. As for the viewing angle, the liquid crystal display according to the present embodiment has a wider viewing angle. Since the liquid crystal display according to the present embodiment utilizes horizontally oriented liquid crystal, the display is capable of high-speed response.

The liquid crystal display according to the ninth embodiment of the present invention will now be explained. The present embodiment provides a method to reduce tone reversal, for example, by forming an electrode opening crossing the liquid crystal orientation at least to one of the transparent electrodes in the liquid crystal display of embodiment 5. As mentioned before, dividing liquid crystal orientation into four areas effectively prevents tone reversal. However, realizing a stable orientation division constantly involves increased processes, and therefore, not preferable. By providing electrode openings, the four divided areas can bee formed, though not completely. This is explained in the following.

Figure 16:
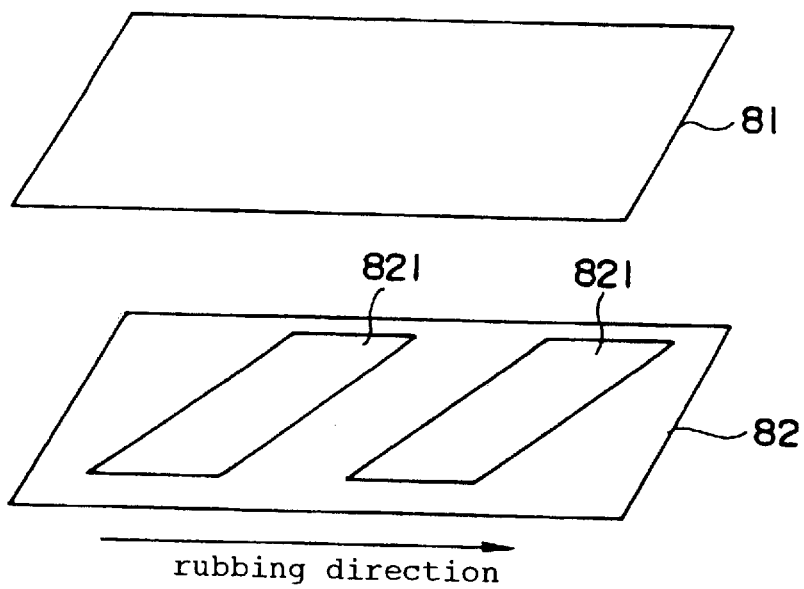
FIG. 16 is an explanatory view showing the structure of the transparent electrodes of the liquid crystal display according to the ninth embodiment of the present invention.
Figure 17:
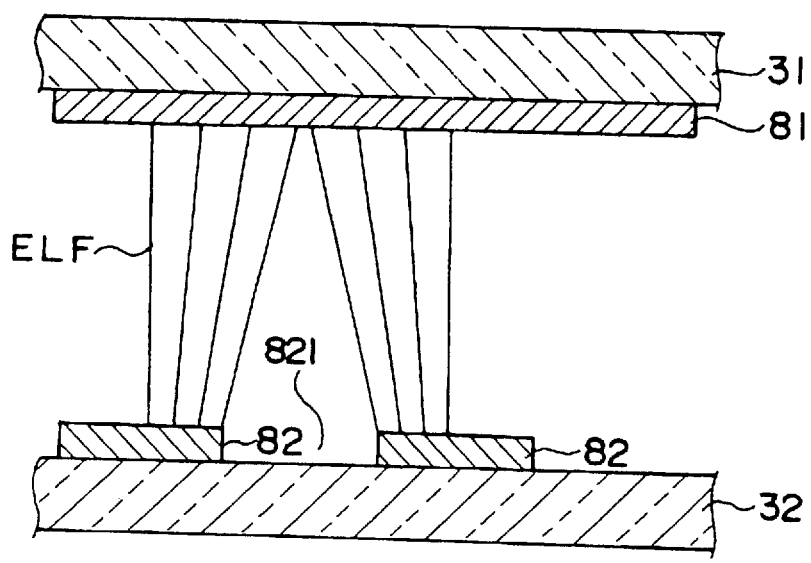
FIG. 17 is an explanatory view showing the image of the electric line of force generated between the transparent electrodes of the liquid crystal display according to the ninth embodiment of the present invention.
Figure 18:
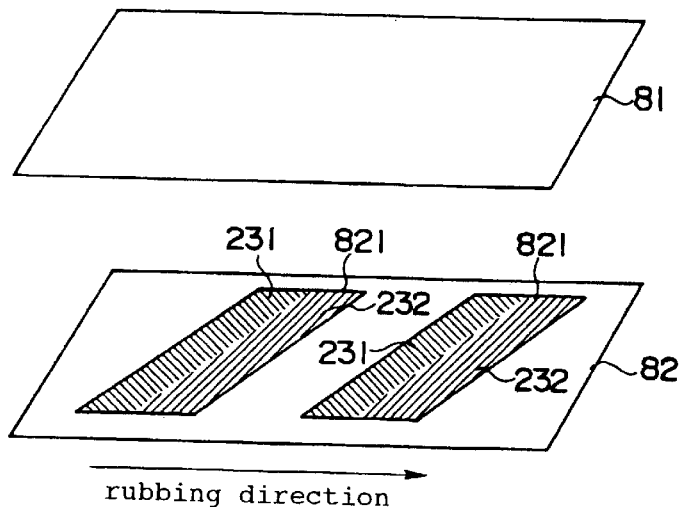
FIG. 18 is an explanatory view showing the direction of tilt of the liquid crystal within the liquid crystal display according to the ninth embodiment of the present invention.

The liquid crystal display according to embodiment 9 is formed to have the same structure as the liquid crystal display of embodiment 5. However, the thickness of the liquid crystal panel of embodiment 9 is set to 4 μm, and Δn of the liquid crystal material is set to 0.7. Further, as shown in FIG. 16, slit-shaped openings 821 are formed to the lower transparent electrode 82. When voltage is impressed between electrode 81 and electrode 82, as shown in FIG. 17, the electric line of force ELF generated between the electrode 82 and electrode 81 does not appear to the area of the opening 821, and therefore, an oblique electric field is generated from the electrode 82 toward the electrode 81. As a result, the tilt direction 231 and the tilt direction 232 of the liquid crystal are twisted to the left and right directions as shown in FIG. 18. This twist of the tilt direction of the liquid crystal is also generated in the electrode 81. Accordingly, with four kinds of twisted orientations introduced (including the upper and lower tilt), the present embodiment provides a liquid crystal display with reduced tone reversal.

Each opening 821 formed to one of the transparent electrodes 82 should be set so that both the width of the electrode portion and the width of the opening portion are set in the range of 10 to 40 μm, so that the oblique electric field functions effectively. If the width is smaller than the above range, the electric field will not be slanted, and if the width is greater, a sufficient twisting region cannot be secured. Moreover, the angle of the opening 281 should be set so that it ranges between 45 to 75 degrees against the rubbing angle, so that sufficient inner plane rotational torque for liquid crystal is obtained.

Figure 19:
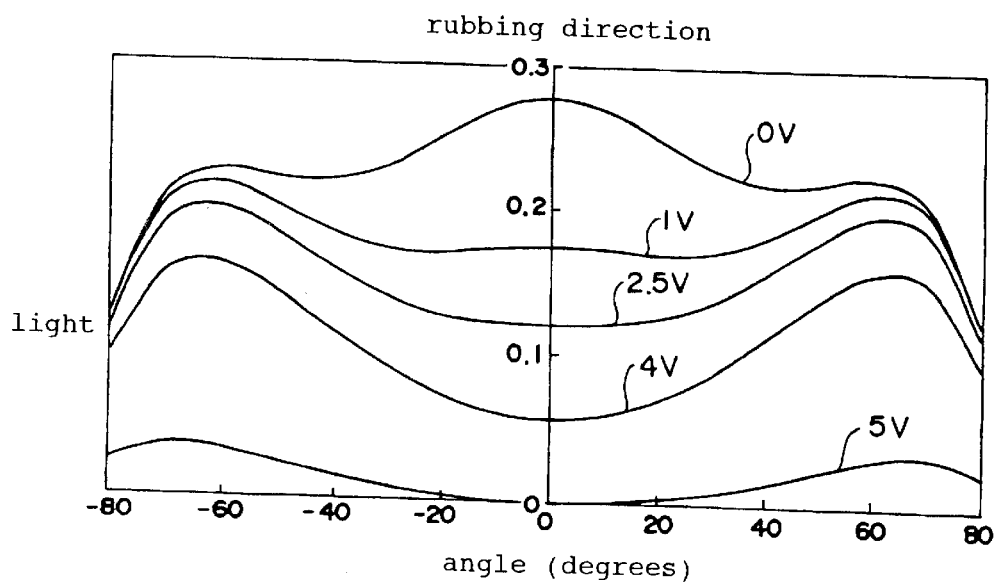
FIG. 19 is an explanatory view showing the viewing angle characteristic of the liquid crystal display according to the ninth embodiment of the present invention.

The viewing angle characteristics of the transmission rate in the rubbing direction of the present liquid crystal display are evaluated. As a result, as shown in FIG. 19, a good tone performance is obtained with no tone reversal generated. Embodiment 9 can be applied to both the horizontal orientation and vertical orientation. Moreover, the above-mentioned embodiments referred to liquid crystal displays equipped with a plural number of retardation plates. However, the plurality of retardation plates can also be replaced with just one retardation plate having a retardation compensation effect that corresponds to the compensation effects of the plurality of retardation plates, in order to provide a liquid crystal display having the same advantages.

As explained, the present invention provides a liquid crystal display with a liquid crystal panel having a high-speed response that could not have been realized by the conventional compensation methods, and a viewing angle as wide as that of an MVA or an IPS, by applying a lens sheet to the panel and performing a simple orientation control.

We claim:

1. A liquid crystal display including a display portion formed of a transmission-type liquid crystal panel having a viewing surface side, said liquid crystal display comprising a nematic liquid crystal layer having a horizontal arrangement and positive anisotropy of dielectric constant, a pair of transparent substrates, each having an inner surface equipped with transparent electrodes and an outer surface, disposed such that said liquid crystal layer is sandwiched between said inner surfaces of said substrates, a pair of polarized plates arranged in cross-Nicol and having absorption axes respectively oriented differently from the direction of liquid crystal orientation, and a first retardation plate positioned so that its slow-phase axis direction is substantially orthogonal to the direction of liquid crystal orientation, said first retardation plate compensating for the birefringence of said liquid crystal layer parallel to said substrate surfaces generated when a voltage equal to or more than 8 V has been impressed on said liquid crystal panel:

wherein when no voltage is impressed said liquid crystal layer has a retardation set larger than the ½ wavelength condition, white-display voltage is set 1V or more higher than the response voltage value of the liquid crystal, and the retardation of the liquid crystal is set to a range of 200 nm–250 nm, wherein said liquid crystal layer includes two kinds of orientation regions, each region having a direction of liquid crystal orientation at an angle of approximately 180 degrees to the direction of liquid crystal orientation of the other region, and wherein said display is further equipped with a lens sheet mounted to the viewing surface side of said liquid crystal panel for either scattering or refracting wider than its incident angle a light ray being stretched in the direction substantially parallel to the direction of liquid crystal orientation.

2. The liquid crystal display according to claim 1, further comprising a second retardation plate having a negative retardation in the direction perpendicular to said substrate surfaces.

3. The liquid crystal display according to claim 2, further comprising a third retardation plate having a slow-phase axis in the direction corresponding to the absorption axis direction of said polarizing plate.

4. The liquid crystal display according to claim 3, wherein each retardation plate comprises two or more plates which are mounted on both outer sides of said pair of substrates of said liquid crystal panel, and which are mounted in the following order:

polarizing plate, third retardation plate, second retardation plate, first retardation plate, substrate, liquid crystal layer, substrate, first retardation plate, second retardation plate, third retardation plate and polarizing plate.

5. The liquid crystal display according to claim 4, wherein each retardation plate is formed so that the retardation plate mounted on one of the outer sides of said pair of substrates shows substantially the same birefringence as that of the retardation plate mounted on the other outer side of said pair of substrates.

6. A liquid crystal display including a display portion formed of a transmission-type liquid crystal panel having a viewing surface side, said liquid crystal display comprising a nematic liquid crystal layer having a horizontal arrangement and positive anisotropy of dielectric constant, a pair of transparent substrates, each having an inner surface equipped with transparent electrodes and an outer surface, said substrates being disposed such that said liquid crystal layer is sandwiched between said inner surfaces thereof, a pair of polarized plates arranged in cross-Nicol and having absorption axes respectively oriented differently from the directions of liquid crystal orientation, and a first retardation plate positioned so that its slow-phase axis direction is substantially orthogonal to the directions of liquid crystal orientation, said first retardation plate compensating for the birefringence of said liquid crystal layer parallel to said substrate surfaces generated when a voltage equal to or more than 8 V has been impressed on said liquid crystal panel:

wherein when no voltage is impressed said liquid crystal layer has a retardation set larger than the ½ wavelength condition, white-display voltage is set 1V or more higher than the response voltage value of the liquid crystal, and the retardation of the liquid crystal is set to a range of 200 nm–250 nm, wherein said liquid crystal layer includes two kinds of orientation regions, each region having a direction of liquid crystal orientation at an angle of approximately 180 degrees to the direction of liquid crystal orientation of the other region, and wherein said display is further equipped with a lens sheet mounted substantially adjacent to the viewing surface side of said liquid crystal panel for either scattering or refracting light rays respectively emanating from said orientation regions substantially parallel to the directions of the liquid crystal orientations thereof at angles larger than the incident angles of said light rays to said lens.

7. The liquid crystal display according to claim 6, further comprising a second retardation plate having negative retardation in the direction perpendicular to said substrate surfaces.

8. The liquid crystal display according to claim 7, further comprising a third retardation plate having a slow-phase axis in the direction corresponding to the adsorption axis direction of said polarizing plate.

9. The liquid crystal display according to claim 8, wherein each retardation plate comprises two or more plates which are mounted on both outer sides of said pair of substrates of said liquid crystal panel, and which are mounted in the following order:

polarizing plate, third retardation plate, second retardation plate, first retardation plate, substrate, liquid crystal layer, substrate, first retardation plate, second retardation plate, third retardation plate, and polarizing plate.

10. The liquid crystal display according to claim 9, wherein each retardation plate is formed so that the retardation plate mounted on said outer side of one of said substrates shows substantially the same birefringence as that of the retardation plate mounted on the outer side of the other of said substrates.

\* \* \* \* \*

UNITED STATES PATENT AND TRADEMARK OFFICE
CERTIFICATE OF CORRECTION

PATENT NO.    : 6,600,538 B1
DATED         : July 29, 2003
INVENTOR(S)   : Makosto Shiomi and Shigeaki Mizushima It is certified that error appears in the above-identified patent and that said Letters Patent is hereby corrected as shown below:

<u>Title page, Item [54] and Column 1, lines 1-3,</u>
Please delete the present Title in its entirety, and substitute the following
-- LIQUID CRYSTAL DISPLAY APPARATUS INCLUDING LIQUID CRYSTAL PANEL HAVING HIGH-SPEED RESPONSE AND LENS SHEET PROVIDING WIDE VIEWING ANGLE --

<u>Title page,</u>
Item [73], Assignee, please change "Shigeaki Mizushima" to -- Sharp Kabushiki Kaisha --

Signed and Sealed this

Fourth Day of November, 2003

JAMES E. ROGAN
*Director of the United States Patent and Trademark Office*